(12) United States Patent
Oshima et al.

(10) Patent No.: US 9,567,012 B2
(45) Date of Patent: Feb. 14, 2017

(54) VEHICLE UPPER STRUCTURE

(71) Applicant: TOYOTA JIDOSHA KABUSHIKI KAISHA, Toyota-shi (JP)

(72) Inventors: Takuya Oshima, Okazaki (JP); Keisuke Yasuda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/881,670

(22) Filed: Oct. 13, 2015

(65) Prior Publication Data

US 2016/0107698 A1    Apr. 21, 2016

(30) Foreign Application Priority Data

Oct. 15, 2014    (JP) .................................. 2014-210600

(51) Int. Cl.
| | | |
|---|---|---|
| *B62D 25/06* | (2006.01) | |
| *B62D 21/15* | (2006.01) | |
| *B62D 25/02* | (2006.01) | |
| *B62D 27/02* | (2006.01) | |

(52) U.S. Cl.
CPC .............. *B62D 21/157* (2013.01); *B62D 25/02* (2013.01); *B62D 25/06* (2013.01); *B62D 27/023* (2013.01)

(58) Field of Classification Search
CPC ....... B62D 21/157; B62D 25/02; B62D 25/06; B62D 27/023
USPC .................. 296/203.03, 203.01, 210, 187.12
See application file for complete search history.

(56) References Cited

U.S. PATENT DOCUMENTS

| | | | |
|---|---|---|---|
| 7,213,874 B2 * | 5/2007 | Osterberg ............... | B62D 25/06 296/203.03 |
| 2006/0202520 A1 | 9/2006 | Osterberg et al. | |
| 2009/0108634 A1 | 4/2009 | Reed et al. | |
| 2011/0233965 A1 | 9/2011 | Oka | |
| 2014/0028057 A1 | 1/2014 | Nishimura et al. | |

FOREIGN PATENT DOCUMENTS

| | | |
|---|---|---|
| EP | 2 471 697 A1 | 7/2012 |
| JP | 61-7473 U | 1/1986 |
| JP | 62-10177 U | 1/1987 |
| JP | 64-39178 U | 3/1989 |
| JP | 6-18157 U | 3/1994 |
| JP | 10-167114 A | 6/1998 |
| JP | 2010-132244 A | 6/2010 |
| JP | 2014-24505 | 2/2014 |
| WO | WO 2012/114699 A1 | 8/2012 |

OTHER PUBLICATIONS

Partial English translation of Japanese Office Action issued Oct. 4, 2016 in Patent Application No. 2014-210600.

* cited by examiner

*Primary Examiner* — Dennis H Pedder
(74) *Attorney, Agent, or Firm* — Oblon, McClelland, Maier & Neustadt, L.L.P.

(57) ABSTRACT

A vehicle upper structure includes a roof side rail, a first roof R/F, and a gusset. The roof side rail extends in a vehicle front-rear direction. The first roof R/F has a first bulging portion and a first flange portion, and extends farther toward an inside of a vehicle cabin in a vehicle width direction than the roof side rail. The gusset is arranged extending between the roof side rail and an end portion of the first roof R/F in the vehicle width direction, and has a second bulging portion and a second flange portion on an inner end portion on the inside in the vehicle width direction.

5 Claims, 7 Drawing Sheets

VEHICLE UPPER STRUCTURE

INCORPORATION BY REFERENCE

The disclosure of Japanese Patent Application No. 2014-210600 filed on Oct. 15, 2014 including the specification, drawings and abstract is incorporated herein by reference in its entirety.

BACKGROUND OF THE INVENTION

1. Field of the Invention

The invention relates to a vehicle upper structure.

2. Description of Related Art

Japanese Utility Model Application Publication No. 61-007473 (JP 61-007473 U) describes a vehicle upper structure that includes a roof center reinforcement upper, a roof center reinforcement lower, and an upper bracket. With this vehicle upper structure, the roof center reinforcement upper is connected to an upper surface of the roof center reinforcement lower in a vehicle up and down direction, and the upper bracket is connected to a lower surface of the roof center reinforcement lower in the vehicle up and down direction. In other words, the vehicle upper structure is one in which only a bottom portion of the roof reinforcement is connected to a gusset.

However, with the related art described above, a collision load applied to a roof side rail is transmitted only at edge lines of a ventral surface when there is a collision with a vehicle side surface (i.e., when there is a side collision), so the gusset may easily deform and the sectional shape of the gusset may end up not being effectively utilized to the full extent. Thus, there is room for improvement in terms of inhibiting deformation of a vehicle upper portion.

SUMMARY OF THE INVENTION

The invention thus provides a vehicle upper structure in which deformation of a vehicle upper portion is able to be inhibited when a side collision occurs.

One aspect of the invention relates to a vehicle upper structure that includes a roof side rail, a roof reinforcement, and a gusset. The roof side rail extends in a vehicle front-rear direction. The roof reinforcement includes a first bulging portion that bulges out downward in a vehicle up and down direction, and a first flange portion that protrudes in the vehicle front-rear direction from the first bulging portion. The roof reinforcement extends farther toward an inside of a vehicle cabin in a vehicle width direction than the roof side rail. The gusset is arranged extending between the roof side rail and an end portion of the roof reinforcement in the vehicle width direction. The gusset has, on an inner end portion on an inside in the vehicle width direction, a second bulging portion that bulges out downward in the vehicle up and down direction and a second flange portion that protrudes in the vehicle front-rear direction from the second bulging portion. The gusset is connected at an outer end portion on an outside in the vehicle width direction to the roof side rail. The gusset is such that the second bulging portion and the second flange portion are overlapped with, and fastened to, the first bulging portion and the first flange portion, respectively, from below in the vehicle up and down direction.

In this vehicle upper structure, the second bulging portion of the gusset is fastened to the first bulging portion of the roof reinforcement, and the second flange portion of the gusset is fastened to the first flange portion of the roof reinforcement. Therefore, the gusset and the roof reinforcement are connected at a plurality of locations in the vehicle front-rear direction, so a collision load input via the roof side rail when a side collision occurs is able to be transmitted by the entire cross-section of the gusset and the roof reinforcement in the vehicle front-rear direction. In this way, the load is able to be efficiently transmitted to the gusset and the roof reinforcement, so deformation of the vehicle upper portion is able to be inhibited when a side collision occurs.

As described above, the vehicle upper structure has a beneficial effect in which deformation of the vehicle upper portion is able to be inhibited when a side collision occurs.

A first protruding portion that protrudes upward in the vehicle up and down direction from a bottom portion of the first bulging portion may be formed on the roof reinforcement of the vehicle upper structure, and a second protruding portion that protrudes upward in the vehicle up and down direction from a bottom portion of the second bulging portion and overlaps with the first protruding portion from below in the vehicle up and down direction, may be formed on the gusset.

With the vehicle upper structure, the first protruding portion and the second protruding portion overlap, so the connection strength of the gusset and the roof reinforcement is improved. As a result, the upper limit of the load transmitted to the gusset and the roof reinforcement is able to be increased. Also, the contact area between the gusset and the roof reinforcement is greater, so the transmission efficiency of a collision load at the gusset and the roof reinforcement is able to be improved.

The vehicle upper structure has a beneficial effect in which the upper limit of a load transmitted to the gusset and the roof reinforcement is able to be increased.

The gusset of the vehicle upper structure may be fastened in at least two locations to the first flange portion in the vehicle front-rear direction, and in at least two locations to the first bulging portion, with the first protruding portion located between the at least two locations in the vehicle front-rear direction.

In the vehicle upper structure, there are more fastening locations than there are with a structure in which the first bulging portion and the second bulging portion are fastened by a single bolt. Therefore, the connection strength of the fastening portion of the gusset and the roof reinforcement is able to be increased.

The vehicle upper structure has a beneficial effect in which the connection strength of the fastening portion of the gusset and the roof reinforcement is able to be increased.

The roof reinforcement of the vehicle upper structure may include a first roof reinforcement that has the first bulging portion and the first flange portion and is overlapped with the gusset from above in the vehicle up and down direction, and a second roof reinforcement that is overlapped with the first roof reinforcement from above in the vehicle up and down direction so as to form a closed cross-section with the first roof reinforcement. Also, the first flange portion, the second flange portion, and the second roof reinforcement may be fastened together.

In this vehicle upper structure, the first roof reinforcement, the second roof reinforcement, and the gusset are fastened together by a bolt. Here, the gusset is fastened at a thick portion where the first roof reinforcement and the second roof reinforcement overlap. As a result, the thickness of the fastening portion of the first roof reinforcement, the second roof reinforcement, and the gusset is increased, so the connection strength of the fastening portion is able to be increased. Moreover, the closed cross-section is formed by the first roof reinforcement and the second roof reinforcement, so the upper limit of a load that is transmitted to the first roof reinforcement and the second roof reinforcement is able to be increased.

The vehicle upper structure has a beneficial effect in which the connection strength of the fastening portion of the gusset and the roof reinforcement is able to be increased.

A roof panel may be provided above the second roof reinforcement of the vehicle upper structure in the vehicle up and down direction, and an extended portion that extends toward the roof side rail and is supported by the roof side rail may be formed on an end portion of the second roof reinforcement in the vehicle width direction. Also, a stepped portion that makes a height of the second roof reinforcement in the vehicle up and down direction lower than a height of the extended portion in the vehicle up and down direction may be formed on the extended portion. Further, a fastening member that fastens the first roof reinforcement, the second roof reinforcement, and the gusset together may be fastened from below in the vehicle up and down direction.

In this vehicle upper structure, when the extended portion is supported by the roof side rail, the second roof reinforcement is arranged offset downward in the vehicle up and down direction with respect to the extended portion due to the stepped portion. Therefore, the space between the second roof reinforcement and the roof panel is wider, so a place to arrange the fastening member between the second roof reinforcement and the roof panel is able to be ensured when fastening the fastening member from below in the vehicle up and down direction.

The vehicle upper structure has a beneficial effect in which a place to arrange the fastening member between the second roof reinforcement and the roof panel is able to be ensured.

In the vehicle upper structure described above, a vertical wall portion that extends downward in the vehicle up and down direction from an outer end portion of a bottom portion in the vehicle width direction when viewed from the vehicle front-rear direction may be formed on the gusset. Also, the vertical wall portion of the gusset may be connected by welding to a vertical wall portion of a roof side rail inner panel, in a position that is to an inside of the vertical wall portion of the roof side rail inner panel in the vehicle width direction, and lower than a center portion of the vertical wall portion of the roof side rail inner panel in the vehicle up and down direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the vehicle upper structure according to the invention will be described. In the drawings, the arrow FR indicates forward in a vehicle front-rear direction, the arrow UP indicates upward in a vehicle up and down direction, and the arrow OUT indicates outward in a vehicle width direction.

[Overall Structure of the Vehicle]

Figure 1:
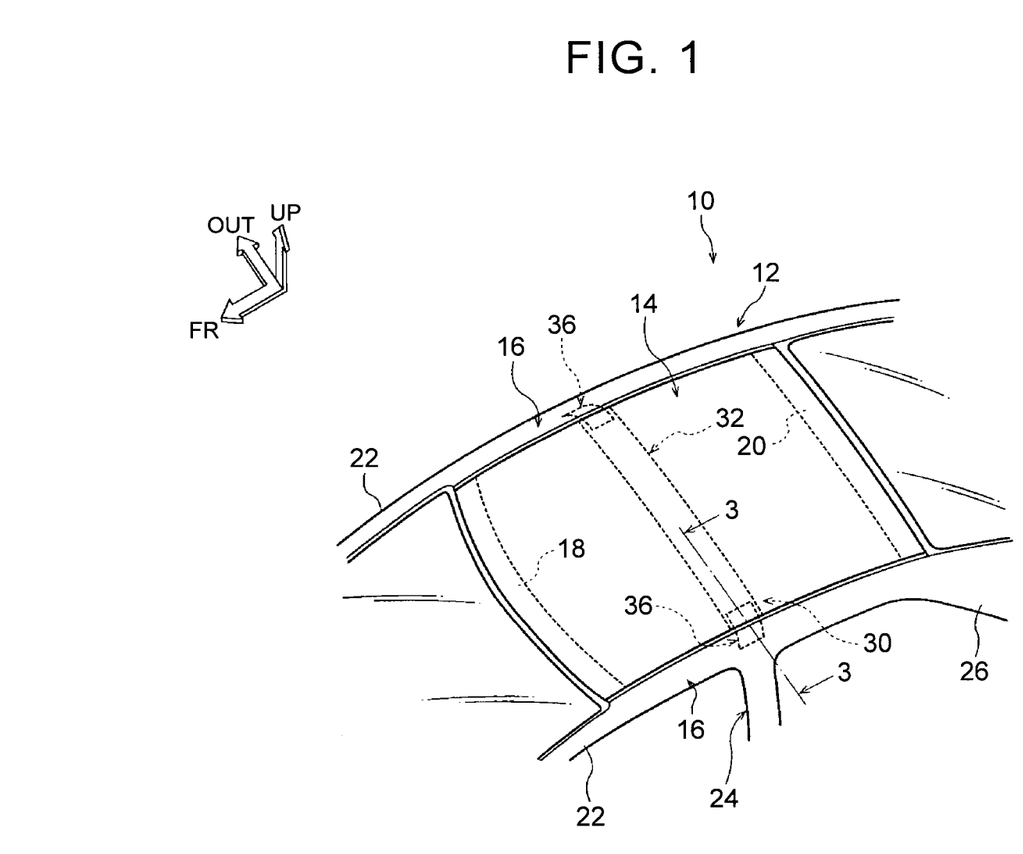
FIG. 1 is a perspective view of an upper portion of a vehicle to which a vehicle upper structure according to an example embodiment of the invention has been applied.

FIG. 1 is a view of a vehicle 10 according to one example embodiment of the invention. A roof panel 14 is provided on a vehicle upper portion 12 of the vehicle 10.

Figure 3:
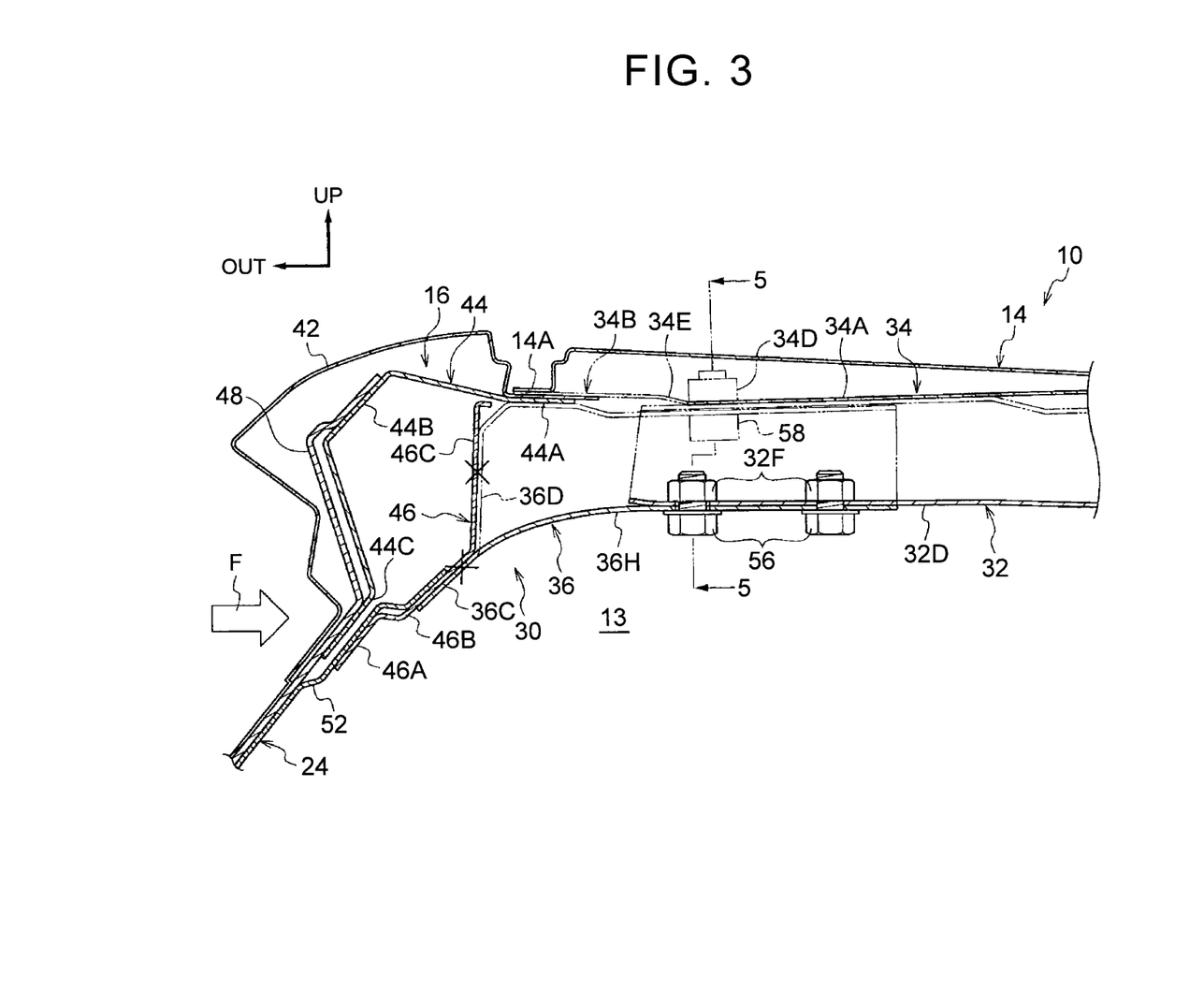
FIG. 3 is an enlarged sectional view of a cross-section taken along line 3-3 in FIG. 1.

As shown in FIG. 3, the roof panel 14 is made of metal such as steel sheet (carbon or glass may also be used) and formed having a generally hat-shaped cross-section. This roof panel 14 has a flange portion 14A on both end portions in a vehicle width direction. Each flange portion 14A is connected to a corresponding roof side rail 16, described later, via an extended portion 34B, described later, of a second roof reinforcement 34. Further, a portion of the roof panel 14 that is to the inside of the second roof reinforcement 34 in the vehicle width direction is connected (adhered) to a first roof reinforcement 32 by a mastic adhesive, not shown.

As shown in FIG. 1, the roof side rail 16 that extends in the vehicle front-rear direction is provided on both sides of the roof panel 14 in the vehicle width direction. A side outer panel 42 (see FIG. 3) is provided to the outside of the roof side rail 16 in the vehicle width direction. This side outer panel 42 is not shown in FIG. 1.

A front header 18 extends in the vehicle width direction between front end portions of the pair of roof side rail 16. A rear header 20 extends in the vehicle width direction between rear end portions of the pair of roof side rail 16. Also, a front pillar 22 extends toward the front in the vehicle front-rear direction and downward in the vehicle up and down direction from a front end portion of each roof side rail 16. Further, a center pillar 24 as a pillar extends downward in the vehicle up and down direction from a center portion of each roof side rail 16 in the vehicle front-rear direction. In addition, a rear pillar 26 extends toward the rear of the vehicle and downward in the vehicle up and down direction from a rear end portion of each roof side rail 16.

A lower end portion of the of the front pillar 22, a lower end portion of the center pillar 24, and a lower end portion of the rear pillar 26 are each connected to a rocker, not shown, that extends in the vehicle front-rear direction. Further, a vehicle upper structure 30 is provided on the vehicle upper portion 12.

[Main Structure]

Next, the vehicle upper structure 30 will be described.

Figure 2:
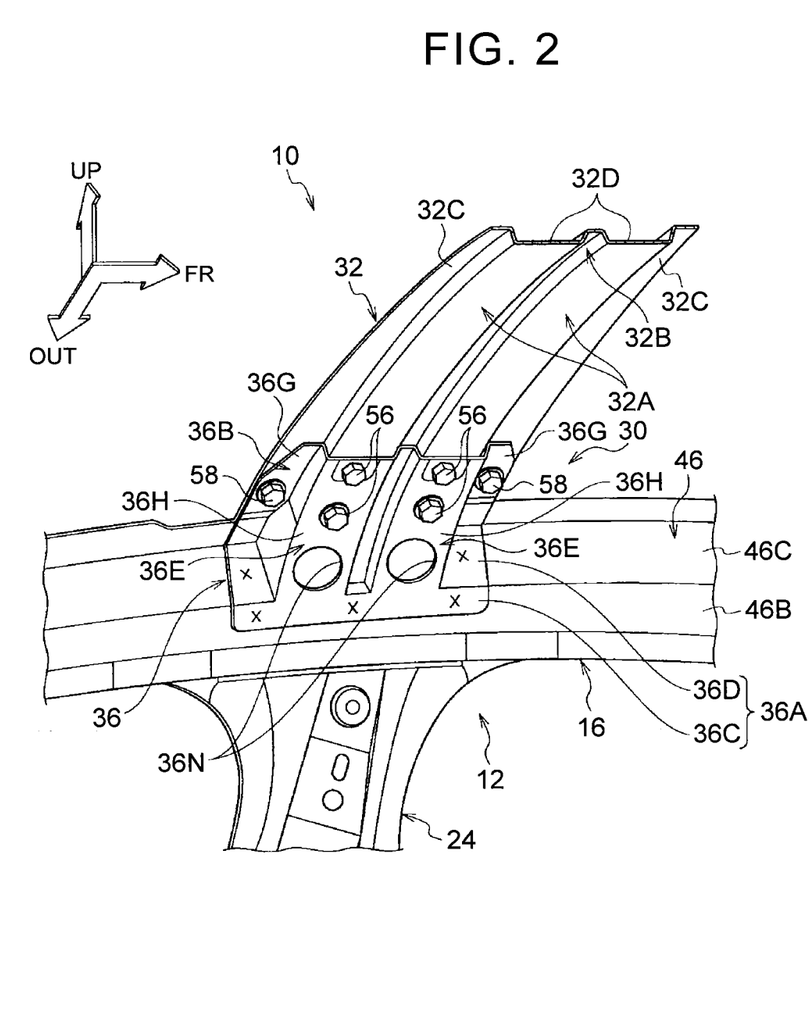
FIG. 2 is a perspective view of the main portions of the vehicle upper portion according to the example embodiment, viewed from a vehicle inside.

As shown in FIG. 2, the vehicle upper structure 30 includes the roof side rail 16, and the first roof reinforcement 32 and the second roof reinforcement 34 (see FIG. 4) as roof reinforcements, that are described above, as well as a gusset 36. The first roof reinforcement 32 will hereinafter be referred to as "first roof R/F 32", and the second roof reinforcement 34 will hereinafter be referred to as "second roof R/F 34".

Here, the vehicle upper structure 30 has the same connecting structure on both sides of the vehicle upper portion 12 in the vehicle width direction. Therefore, the vehicle upper structure 30 on only one side in the vehicle width direction will be described. A description of the vehicle upper structure 30 on the other side will be omitted.

<Roof Side Rail>

As shown in FIG. 3, the roof side rail 16 is formed by a roof side rail outer panel 44 that is arranged on an outside of a vehicle cabin 13, and a roof side rail inner panel 46 that is arranged on an inside of the vehicle cabin 13. An upper end portion 44A in the vehicle up and down direction of the roof side rail outer panel 44 is connected to the gusset 36 by welding. Also, a center portion 44B and a lower end portion 44C of the roof side rail outer panel 44 are connected by welding to a center pillar outer panel 48 that forms a portion of the center pillar 24. In FIG. 3, members and portions positioned farther forward in the vehicle front-rear direction than the cross-section are indicated by chain double-dashed lines.

A lower end portion 46A of the roof side rail inner panel 46 is connected by welding to an upper portion in the vehicle up and down direction of a center pillar inner panel 52 that forms a portion of the center pillar 24. Furthermore, the center pillar outer panel 48 and the center pillar inner panel 52 are connected together farther downward in the vehicle up and down direction than the lower end portion 44C and the lower end portion 46A. In this way, the roof side rail 16 forms a closed cross-section.

Also, an inclined portion 46B that extends upward at an angle toward the inside in the vehicle width direction is higher (farther upward) than the lower end portion 46A of the roof side rail inner panel 46 in the vehicle up and down direction. Moreover, a vertical wall portion 46C that extends upward in the vehicle up and down direction is formed above (farther upward than) the inclined portion 46B in the vehicle up and down direction.

<First Roof R/F>

As shown in FIG. 3, the first roof R/F 32 is a reinforcing member of the roof panel 14, and extends in the vehicle width direction farther to the inside of the vehicle cabin 13 (hereinafter, referred to as "vehicle cabin inside") than the roof panel 14. Also, the first roof R/F 32 is arranged farther to the vehicle cabin inside than the pair of roof side rails 16. Moreover, the first roof R/F 32 is formed long with the vehicle width direction being the length direction, and has a trapezoidal wavy sectional shape in the vehicle front-rear direction. In addition, end portions of the first roof R/F 32 in the vehicle width direction are inclined gently downward toward the roof side rails 16.

Figure 5:
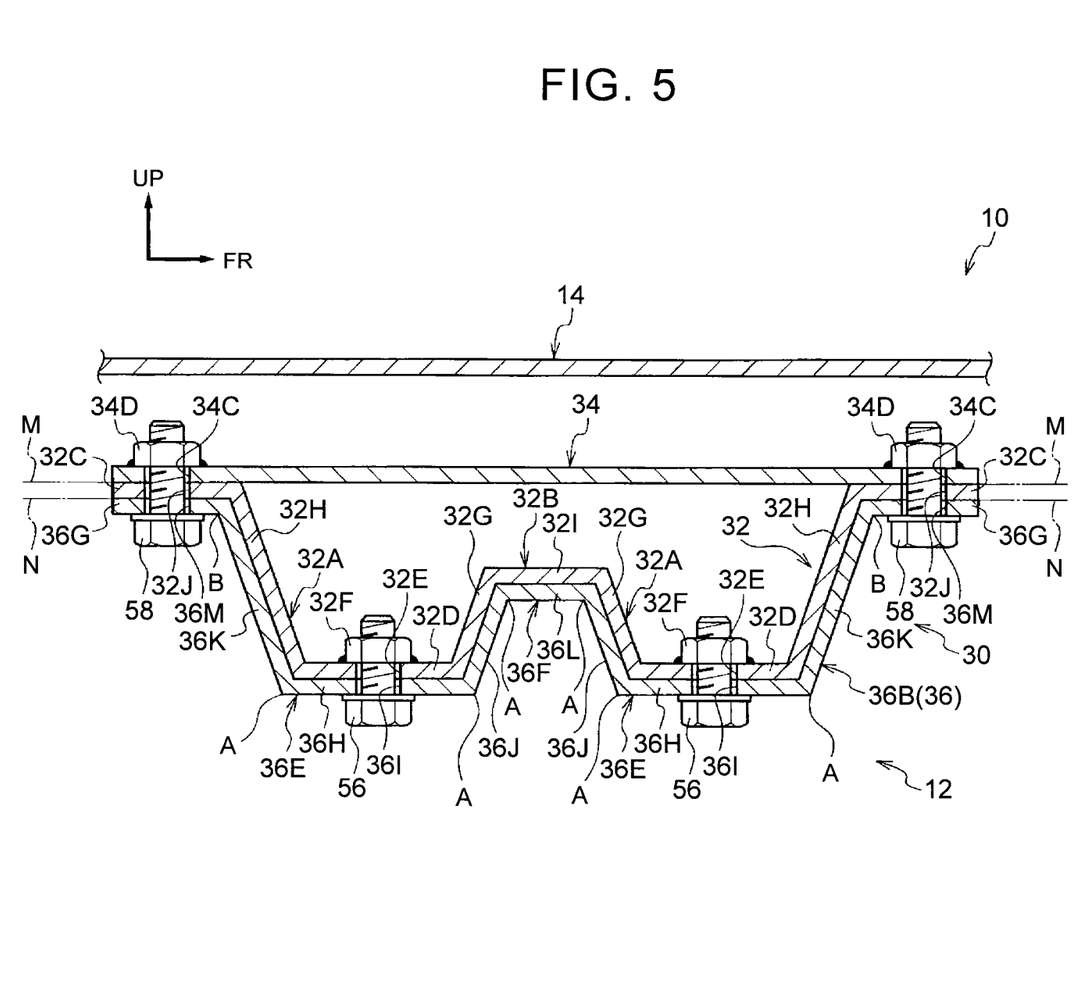
FIG. 5 is an enlarged sectional view of a cross-section taken along line 5-5 in FIG. 1.

As shown in FIG. 5, the first roof R/F 32 includes two first bulging portions 32A, one first protruding portion 32B formed between the two first bulging portions 32A, and two first flange portions 32C protruding out from both end portions of the two first bulging portions 32A in the vehicle front-rear direction.

(First Bulging Portions)

As shown in FIG. 5, the first bulging portions 32A are portions that bulge out downward in the vehicle up and down direction, with a surface M (the alternate long and short dash line M in the drawing) that contacts the second roof R/F 34 as a reference surface. Also, one of the first bulging portions 32A is formed in an inverted trapezoidal shape when viewed in the vehicle width direction. Further, a bottom portion 32D that extends in the vehicle front-rear direction and the vehicle width direction is formed on a lower end of each of the first bulging portions 32A in the vehicle up and down direction.

A through-hole 32E that passes through in the vehicle up and down direction is formed in the bottom portion 32D. In this example embodiment, as an example, the through-hole 32E is formed in two locations in each bottom portion 32D. That is, the through-holes 32E are formed in two locations, spaced apart from each other in the vehicle width direction (in the depth direction in FIG. 5), in each bottom portion 32D. Also, the size of each through-hole 32E is large enough so that a shaft portion of a first bolt 56 is able to be inserted through it. Further, a weld nut 32F is integrally formed on a peripheral edge, on an upper side in the vehicle up and down direction, of each through-hole 32E in the bottom portion 32D.

Moreover, each of the first bulging portion 32A includes an inclined portion 32G and an inclined portion 32H. The inclined portion 32G is also a part of the first protruding portion 32B and extends upward at an angle from an end portion of the bottom portion 32D in the vehicle front-rear direction. The inclined portion 32H is an inclined portion that is longer than the inclined portion 32G and extends upward at an angle from an end portion on the opposite side of the bottom portion 32D than the inclined portion 32G side.

(First Protruding Portion)

As shown in FIG. 5, the first protruding portion 32B is a portion that protrudes upward in the vehicle up and down direction from the bottom portion 32D, with the bottom portion 32D as a reference. Also, the first protruding portion 32B is formed in a trapezoidal shape when viewed in the vehicle width direction. Moreover, the first protruding portion 32B has inclined portions 32G that are also parts of the first bulging portions 32A, as described above, and an upper bottom portion 32I that becomes an upper base of the trapezoid. The height position of the upper bottom portion 32I in the vehicle up and down direction is a position that is lower than a height position of the first flange portions 32C, described later, in the vehicle up and down direction.

(First Flange Portions)

As shown in FIG. 5, the first flange portions 32C are plate-shaped portions that protrude out in the vehicle front-rear direction toward the front and rear in the vehicle front-rear direction from upper ends of the inclined portions 32H in the vehicle up and down direction. Also, a through-hole 32J that passes through in the vehicle up and down direction is formed in each first flange portion 32C. The size of the through-hole 32J is large enough so that a shaft portion of a second bolt 58 as a fastening member can be inserted through it.

As shown in FIG. 3, in this example embodiment, the first roof R/F 32 is arranged between the pair of center pillars 24, but is not limited to this. The first roof R/F 32 may also be arranged in a position offset toward the front or rear in the vehicle front-rear direction with respect to the center pillars 24. Also, a plurality of first roof R/Fs 32 may be arranged spaced apart in the vehicle front-rear direction. Furthermore, the first roof R/F 32 may be arranged at an angle, when viewed from above, with one end side of the first roof R/F 32 in the vehicle width direction offset in the vehicle front-rear direction from the other end side of the first roof R/F 32.

<Second Roof R/F>

Figure 4:
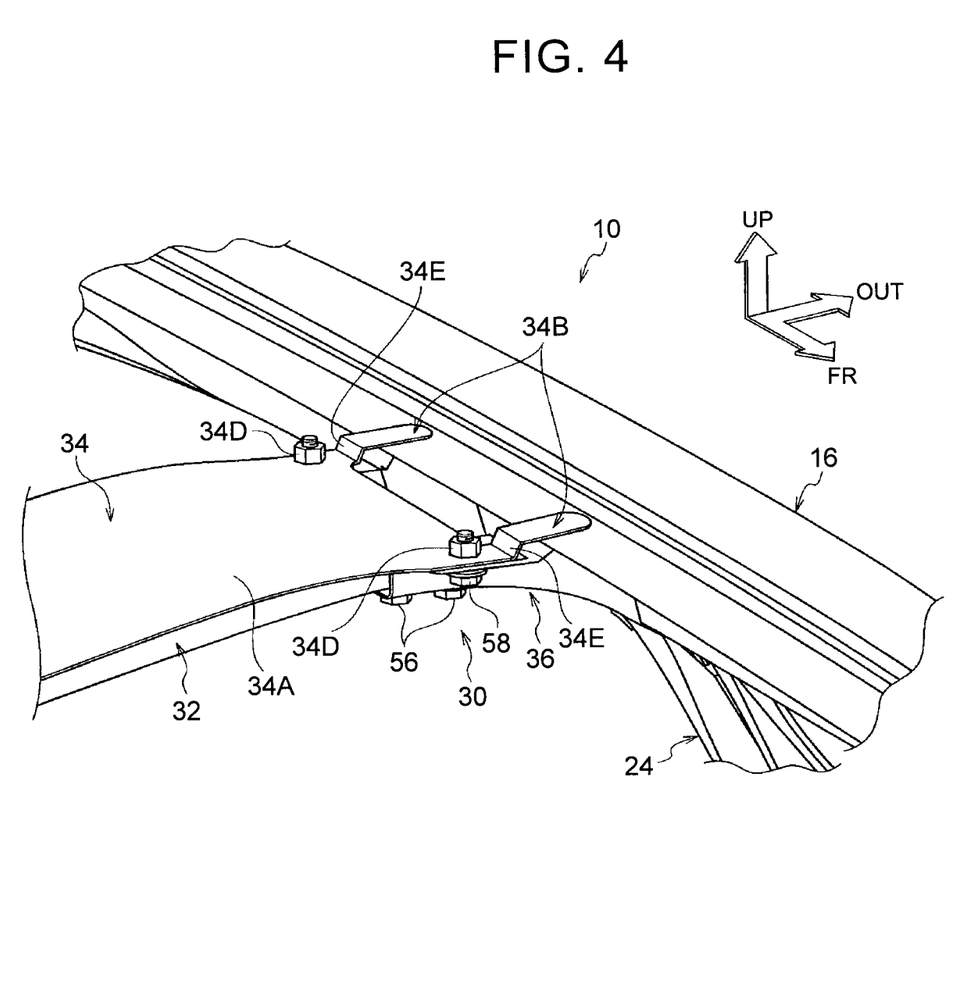
FIG. 4 is a perspective view of the main portions of the vehicle upper portion according to the example embodiment, viewed from a vehicle outside.

As shown in FIG. 4, the second roof R/F 34 is a plate member that has a generally rectangular main body portion 34A with the vehicle width direction being the length direction. Also, two extended portions 34B are formed on each side of the second roof R/F 34 in the vehicle width direction by both sides of the main body portion 34A in the length direction thereof when viewed from above being cut away in a general U-shape. The two extended portions 34B are spaced apart in the vehicle front-rear direction and extend outward in the vehicle width direction from an end portion of the main body portion 34A in the vehicle width direction.

As shown in FIG. 3, an end portion on the outside in the vehicle width direction of each of the two extended portions 34B is connected to a surface on the upper side in the vehicle up and down direction of an end portion on the inside of the side outer panel 42 in the vehicle width direction, and is supported by the roof side rail 16. Also, a stepped portion 34E that is bent in a crank-shape when viewed in the vehicle front-rear direction is formed on a portion on the main body portion 34A side of each of the two extended portions 34B. Here, the height in the vehicle up and down direction of the end portion of the second roof R/F 34 in the vehicle width direction is lower than the height in the vehicle up and down direction of the extended portions 34B due to the stepped portion 34E being formed.

Further, as shown in FIG. 5, the length of the second roof R/F 34 in the vehicle front-rear direction is substantially the same as the length of the first roof R/F 32 in the vehicle front-rear direction. Also, both end portions of the second roof R/F 34 in the vehicle front-rear direction are overlapped with, and connected by laser welding or spot welding to, upper surfaces in the vehicle up and down direction of the first flange portions 32C of the first roof R/F 32. As a result, the second roof R/F 34, together with the first roof R/F 32, forms a closed cross-section and reinforces the roof panel 14.

In addition, a through-hole 34C that passes through in the vehicle up and down direction is formed in each of the two end portions of the second roof R/F 34 in the vehicle front-rear direction. The size of the through-hole 34C is large enough so that a shaft portion of the second bolt 58 is able to be inserted through it. Also, the through-hole 34C is communicated with the inside of the through-hole 32J when both end portions of the second roof R/F 34 in the vehicle front-rear direction are overlapped with the upper surfaces of the first flange portions 32C in the vehicle up and down direction. Furthermore, a weld nut 34D as a fastening member is integrally formed on a peripheral edge, on an upper side in the vehicle up and down direction, of each through-hole 34C in the second roof R/F 34. As shown in FIG. 3, the roof panel 14 described above is provided above the second roof R/F 34 the vehicle up and down direction.

As shown in FIG. 4, in this example embodiment, the contact area between the second roof R/F 34 and the roof side rail 16 is reduced by cutting away both end portions of the second roof R/F 34 in the vehicle width direction in a U-shape, which reduces abnormal noise and the like when the vehicle 10 is running, but the example embodiment is not limited to this. That is, the end portions of the second roof R/F 34 in the vehicle width direction do not have to be cut away. Also, the shape of the cutaway of the second roof R/F 34 is not limited to a U-shape, and may be another shape such as a general circular shape.

<Gusset>

As shown in FIG. 2, the gusset 36 is a structure in which a connecting portion 36A that is connected to the roof side rail 16, and a supporting portion 36B that extends toward the inside in the vehicle width direction from the connecting portion 36A and supports the end portion of the first roof R/F 32 in the vehicle width direction, are integrated together. The connecting portion 36A is one example of an outer end portion that is positioned on the outside in the vehicle width direction. The supporting portion 36B is one example of an inner end portion that is positioned on the inside in the vehicle width direction. In FIG. 2, the locations of the spot welds are indicated by an "X".

{Connecting Portion}

As shown in FIG. 2, the connecting portion 36A of the gusset 36 is formed by a plate-shaped first connecting portion 36C that is connected by spot welding to the inclined portion 46B of the roof side rail 16, and a plate-shaped second connecting portion 36D that is connected by spot welding to the vertical wall portion 46C. The first connecting portion 36C protrudes downward in the vehicle up and down direction from a lower end of the supporting portion 36B in the vehicle up and down direction. The second connecting portion 36D protrudes toward the front and rear in the vehicle front-rear direction from both end portions of the supporting portion 36B in the vehicle front-rear direction. The first connecting portion 36C and the second connecting portion 36D are connected together and form a U-shape when viewed in the vehicle width direction.

{Supporting Portion}

As shown in FIG. 5, the supporting portion 36B of the gusset 36 includes two second bulging portions 36E, one second protruding portion 36F formed between the two second bulging portions 36E, and two flange portions 36G that protrude out from both end portions of the second bulging portions 36E in the vehicle front-rear direction.

(Second Bulging Portions)

As shown in FIG. 5, the second bulging portions 36E are portions that bulge out downward in the vehicle up and down direction, with a surface N (the alternate long and short dash line N in the drawing) that contacts the first roof R/F 32 as a reference surface. Also, one of the second bulging portions 36E is formed in an inverted trapezoidal shape when viewed in the vehicle width direction. Further, a bottom portion 36H in the vehicle front-rear direction and the vehicle width direction is formed on a lower end of each of the second bulging portions 36E in the vehicle up and down direction.

A through-hole 36I that passes through in the vehicle up and down direction is formed in the bottom portion 36H. In this example embodiment, as an example, the through-hole 36I is formed in two locations in each bottom portion 36H. That is, the through-hole 36I is formed in two locations, spaced apart in the vehicle width direction (in the depth direction in FIG. 5), in each bottom portion 36H. Also, the size of the through-hole 36I is large enough so that the shaft portion of the first bolt 56 is able to be inserted through it. As shown in FIG. 2, a through-hole 36N that passes through in the vehicle up and down direction is formed in the bottom portion 36H. This through-hole 36N is a hole that is used when performing work such as welding.

Moreover, as shown in FIG. 5, each of the second bulging portions 36E includes an inclined portion 36J and an inclined portion 36K. The inclined portion 36J is also a part of the second protruding portion 36F and extends upward at an angle from an end portion of the bottom portion 36H in the vehicle front-rear direction. The inclined portion 36K is an inclined portion that is longer than the inclined portion 36J and extends upward at an angle from an end portion on the opposite side of the bottom portion 36H than the inclined portion 36J side.

(Second Protruding Portion)

As shown in FIG. 5, the second protruding portion 36F is a portion that protrudes upward in the vehicle up and down direction from the bottom portion 36H, with the bottom portion 36H as a reference. Also, the second protruding portion 36F is formed in a trapezoidal shape when viewed in the vehicle width direction. Moreover, the second protruding portion 36F has inclined portions 36J that are also parts of the second bulging portions 36E, as described above, and an upper bottom portion 36L that becomes an upper base of the trapezoid. The height position of the upper bottom portion 36L in the vehicle up and down direction is a position that is lower than a height position of the second flange portions 36G, described later, in the vehicle up and down direction.

(Second Flange Portions)

As shown in FIG. 5, the second flange portions 36G are plate-shaped portions that protrude out in the vehicle front-rear direction toward the front and rear in the vehicle front-rear direction from upper ends of the inclined portions 36K in the vehicle up and down direction. Also, a through-hole 36M that passes through in the vehicle up and down direction is formed in each second flange portion 36G. The size of the through-hole 36M is large enough so that the shaft portion of the second bolt 58 can be inserted through it. The length from the end portion of one of the second flange portions 36G to the end portion of the other second flange portion 36G in the vehicle front-rear direction is substantially the same as the lengths of the first roof R/F 32 and the second roof R/F 34 in the vehicle front-rear direction.

The gusset 36 may also be arranged in a position offset to the front or rear in the vehicle front-rear direction with respect to the center pillar 24 (see FIG. 1). Also, a plurality of the gussets 36 may be arranged spaced apart in the vehicle front-rear direction, matching the first roof R/F 32 and the second roof R/F 34.

Here, as shown in FIG. 2, the connecting portion 36A of the gusset 36 is connected by spot welding to the inclined portion 46B and the vertical wall portion 46C of the roof side rail inner panel 46. Also, the first roof R/F 32 is overlapped with the gusset 36, on an upper side in the vehicle up and down direction of the gusset 36, in a state with the first bulging portions 32A contacting the second bulging portions 36E, the first protruding portion 32B contacting the second protruding portion 36F, and the first flange portions 32C contacting the second flange portions 36G.

Furthermore, the second roof R/F 34 is overlapped on the opposite side of the first roof R/F 32 than the gusset 36 side (i.e., on the upper side of the first roof R/F 32 in the vehicle up and down direction). Also, the first roof R/F 32 is fastened by the first bolts 56, and the gusset 36, the first roof R/F 32, and the second roof R/F 34 are fastened by the second bolts 58.

<Assembly of the Vehicle Upper Structure>

As shown in FIG. 3, before assembling the vehicle upper structure 30, the second roof R/F 34 is overlapped with, and connected (joined) to, the first roof R/F 32 from above in the vehicle up and down direction. As one example in this example embodiment, the first roof R/F 32 and the second roof R/F 34 are connected together by spot welding. The spot welds are not shown in the drawing. Also, the roof panel 14 is connected (adhered) to the first roof R/F 32 by a mastic adhesive or the like. In FIG. 3, the locations of the spot welds are indicated by an "X".

Meanwhile, the connecting portion 36A of the gusset 36 is connected by spot welding to the inclined portion 46B and the vertical wall portion 46C of the roof side rail inner panel 46.

Continuing on, the roof panel 14, the first roof R/F 32, and the second roof R/F 34 that are connected together are placed in position on the upper surface of the gusset 36 in the vehicle up and down direction. As a result, the second bulging portions 36E and the second flange portions 36G are overlapped with the first bulging portions 32A and the first flange portions 32C from below in the vehicle up and down direction, and the second protruding portion 36F is overlapped with the first protruding portion 32B from below in the vehicle up and down direction.

Also, the gusset 36 is arranged extending between the roof side rail 16 and the end portions in the vehicle width direction of the first roof R/F 32 and the second roof R/F 34. At this time, the flange portion 14A of the roof panel 14 is overlapped with the upper surface of the end portion of the side outer panel 42, with the extended portions 34B of the second roof R/F 34 sandwiched in between. Also, the extended portions 34B is supported by the roof side rail 16. In this state, the flange portion 14A of the roof panel 14, the extended portions 34B of the second roof R/F 34, the end portion of the side outer panel 42, and the upper end portion 44A of the roof side rail outer panel 44 are welded together.

Continuing on, as shown in FIG. 5, the first bolts 56 are fastened to the weld nuts 32F and the second bolts 58 are fastened to the weld nuts 34D, both from below the gusset 36 in the vehicle up and down direction. More specifically, the gusset 36 is fastened in two locations to the first flange portions 32C in the vehicle front-rear direction, and is fastened in two locations to the first bulging portions 32A with the first protruding portion 32B located between the two locations in the vehicle front-rear direction.

As one example, the gusset 36 is fastened in two locations in the vehicle width direction of each first bulging portion 32A (for a total of four locations). As a result, the vehicle upper structure 30 is formed with the gusset 36, the first roof R/F 32, and the second roof R/F 34 being connected in an overlapping state, and the first roof R/F 32 and the second roof R/F 34 being supported by the gusset 36.

Comparative Example

Figure 6:
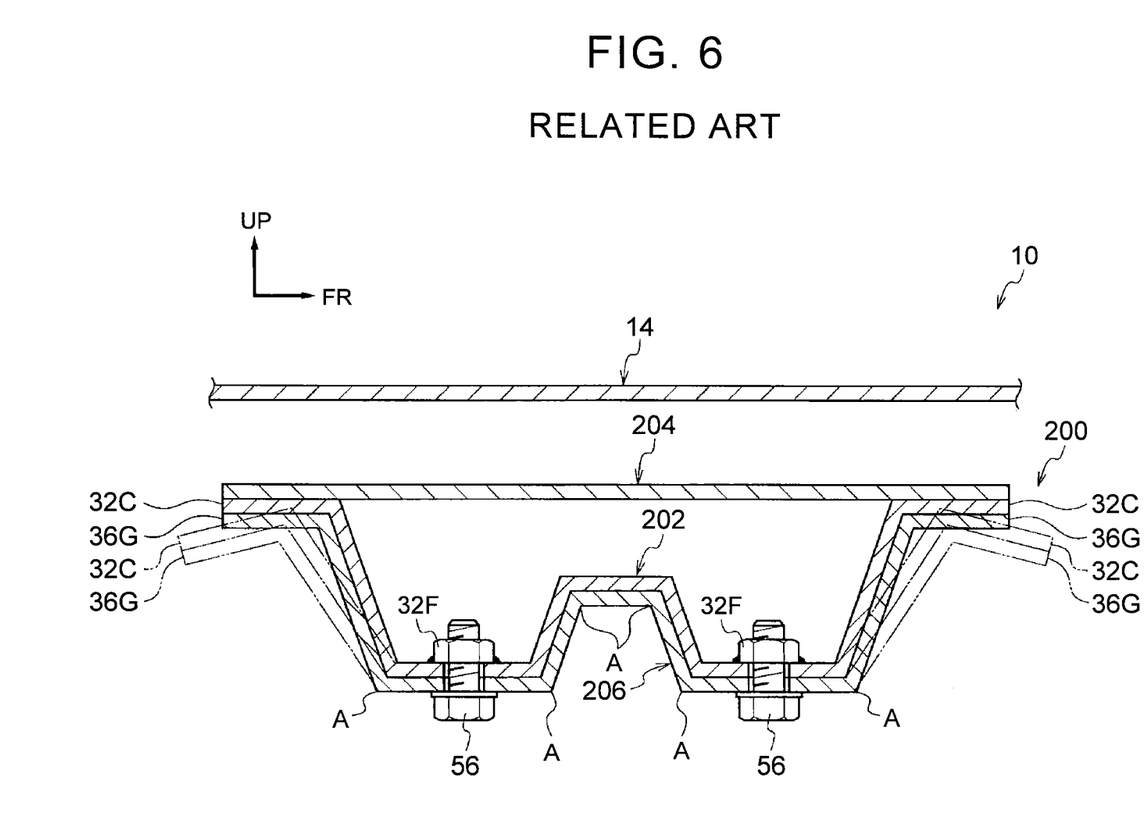
FIG. 6 is an enlarged sectional view of a cross-section of a vehicle upper structure according to a comparative example.

FIG. 6 is a longitudinal sectional view of a vehicle upper structure 200 according to a comparative example with respect to the example embodiment, viewed in the vehicle width direction. The vehicle upper structure 200 of this comparative example is provided with a first roof R/F 202, a second roof R/F 204, and a gusset 206, instead of the first roof R/F 32, the second roof R/F 34, and the gusset 36 (see FIG. 5) of the example embodiment.

The structure of the first roof R/F 202 is the same as that of the first roof R/F 32 (see FIG. 5) of the example embodiment except for that the through-holes 32J are not formed in the first flange portions 32C. The structure of the second roof R/F 204 is the same that of the second roof R/F 34 (see FIG. 5) of the example embodiment except for that the through-holes 34C are not formed. The structure of the gusset 206 is the same as that of the gusset 36 (see FIG. 5) of the example embodiment except for that the through-holes 36M are not formed. That is, the first flange portions 32C, the second flange portions 36G and the second roof R/F 34 of the vehicle upper structure 200 of the comparative example are not fastened by bolts.

Here, in the vehicle upper structure 200 of the comparative example, when there is a collision with the side of the vehicle (i.e., when a side collision occurs), a load is input to the first roof R/F 202, the second roof R/F 204, and the gusset 206 via a roof side rail, not shown.

However, with the vehicle upper structure 200 of the comparative example, the first flange portions 32C, the second flange portions 36G and the second roof R/F 34 are not fastened by bolts, as described above. Therefore, when the load is input to the first roof R/F 202, the second roof R/F 204, and the gusset 206, the load is transmitted at only edge lines A of a ventral surface. As a result, the load that acts locally becomes larger, and the cross-sections of the first flange portions 32C and the second flange portions 36G end up deforming in a manner in which they open up toward the front and rear in the vehicle front-rear direction, as indicated by the alternate long and two short dashes lines in FIG. 6.

That is, with the vehicle upper structure 200 of the comparative example, the sectional shapes in the vehicle front-rear direction of the first roof R/F 202, the second roof R/F 204, and the gusset 206 become misshapen. As a result of this deformation, with the vehicle upper structure 200 of the comparative example, a portion where the load is not easily transmitted from the gusset 36 to the first roof R/F 202 and the second roof R/F 204 is created, so it may be difficult to inhibit deformation of the vehicle upper portion.

<Operation and Effects>

Next, the operation and effects of the vehicle upper structure 30 of the example embodiment will be described.

As shown in FIG. 3, when a load F is input to a vehicle body side portion of the vehicle 10 from a side of the vehicle 10, this load F is first transmitted from the center pillar 24 to the roof side rail 16, and is then input to the gusset 36 that is connected to the roof side rail 16.

Here, as shown in FIG. 5, with the first roof R/F 32 and the gusset 36 in the vehicle upper structure 30, the first bulging portions 32A and the second bulging portions 36E are connected together by the first bolts 56, and the first flange portions 32C and the second flange portions 36G are connected together by the second bolts 58. Therefore, when a load is input to the gusset 36, the load is transmitted not only to the edge lines A of the ventral surface, but also to edge lines B of the first flange portions 32C and the second flange portions 36G. The edge lines A of the ventral surface correspond to apex points of the first bulging portions 32A, the first protruding portion 32B, the second bulging portions 36E, and the second protruding portion 36F in FIG. 5. Also, the edge lines B include edge lines between the first flange portions 32C and the inclined portion 32H, and edge lines between the second flange portions 36G and the inclined portion 36K.

In this way, with the vehicle upper structure 30, the load is transmitted not only to the edge lines A but also to the edge lines B. That is, in the vehicle upper structure 30, the input load (collision load) is transmitted by the entire cross-section in the vehicle front-rear direction of the first roof R/F 32 and the gusset 36, so compared to the comparative example described above, a load that is applied locally is inhibited from becoming larger. Also, the sectional shapes in the vehicle front-rear direction of the first roof R/F 32 and the gusset 36 are inhibited from becoming misshapen. As a result, with the vehicle upper structure 30, a load is efficiently transmitted to the first roof R/F 32 and the gusset 36, so deformation of the vehicle upper portion 12 when a side collision occurs is able to be inhibited.

Also, with the vehicle upper structure 30, the first protruding portion 32B and the second protruding portion 36F are overlapping at a portion other than the portions fastened by the first bolts 56 and the second bolts 58, so the connection strength of the first roof R/F 32 and the gusset 36 is increased. As a result, the upper limit of the load that is transmitted to the first roof R/F 32 and the gusset 36 is able to be increased. Moreover, the contact area between the first roof R/F 32 and the gusset 36 is increased, so the transmission efficiency of the load (the collision load) of the first roof R/F 32 and the gusset 36 is able to be improved.

In addition, as shown in FIG. 2, with the vehicle upper structure 30, the gusset 36 is fastened to the first roof R/F 32 by four first bolts 56 that are lined up in the vehicle front-rear direction and the vehicle width direction, and two second bolts 58 that are lined up in the vehicle width direction. Therefore, there are more fastening locations than there are with a structure in which the first bulging portions 32A and the second bulging portions 36E are fastened by a single bolt, so the connection strength of the fastening portion of the first roof R/F 32 and the gusset 36 is able to be increased.

Also, with the vehicle upper structure 30 shown in FIG. 5, the first roof R/F 32 and the gusset 36 are fastened together by the first bolts 56, as described above. Further, the gusset 36 is fastened by the second bolts 58 at the thick portion where the first roof R/F 32 and the second roof R/F 34 overlap. As a result, the thickness of the fastening portion that is fastened by the second bolts 58 is increased, so the connection strength of the fastening portion of the gusset 36, the first roof R/F 32, and the second roof R/F 34 is able to be increased. Also, the closed cross-section is formed by the first roof R/F 32 and the second roof R/F 34, so the upper limit of a load that is transmitted to the first roof R/F 32 and the gusset 36 is able to be increased.

Moreover, with the vehicle upper structure 30 shown in FIG. 3, the extended portions 34B and the end portion of the roof panel 14 in the vehicle width direction are connected to the roof side rail 16 via the side outer panel 42. Here, the stepped portion 34E is formed on each of the extended portions 34B, so the end portion of the second roof R/F 34 (i.e., the main body portion 34A) in the vehicle width direction is arranged offset downward in the vehicle up and down direction with respect to the extended portions 34B. As a result, the space between the second roof R/F 34 and the roof panel 14 is wider, so a place within which to arrange the weld nuts 34D as a fastening member is able to be ensured between the second roof R/F 34 and the roof panel 14.

In addition, with the vehicle upper structure 30 shown in FIG. 3, the first roof R/F 32 and the second roof R/F 34 are arranged between the pair of center pillars 24. Therefore, the distance from the center pillars 24 to the first roof R/F 32 and the second roof R/F 34 is able to be shorter than it is with a structure in which the first roof R/F 32 and the second roof R/F 34 are arranged offset in the vehicle front-rear direction with respect to the center pillars 24. Thus, with the vehicle upper structure 30, when a load is input to a vehicle body side portion of the vehicle 10, the load is able to be efficiently transmitted from the center pillars 24 to the first roof R/F 32 and the second roof R/F 34 via the gusset 36. As a result, the center pillars 24 are able to be inhibited from collapsing inward in the vehicle width direction, so the space inside the vehicle cabin 13 is able to be ensured.

Also, with the vehicle upper structure 30, the first roof R/F 32 and the second roof R/F 34 are placed on the gusset 36, and the first bolts 56 and the second bolts 58 are fastened from underneath in the vehicle up and down direction. Therefore, with the vehicle upper structure 30, the roof panel 14, the first roof R/F 32, and the second roof R/F 34 are able to be made into a subassembly beforehand, so productivity of the vehicle 10 will not decrease, and a load is able to be efficiently transmitted.

Moreover, with the vehicle upper structure 30, the first roof R/F 32, the second roof R/F 34, and the gusset 36 are fastened together by the first bolts 56 and the second bolts 58. Therefore, even if there is no welding equipment at the location where the vehicle 10 is assembled, the subassembly of the roof panel 14, the first roof R/F 32, and the second roof R/F 34 is able to simply be bolted to the gusset 36 that has been welded to the roof side rail 16 beforehand. As a result, the vehicle upper structure 30 is able to be assembled regardless of whether there is any welding equipment available.

Modified Example

Figure 7:
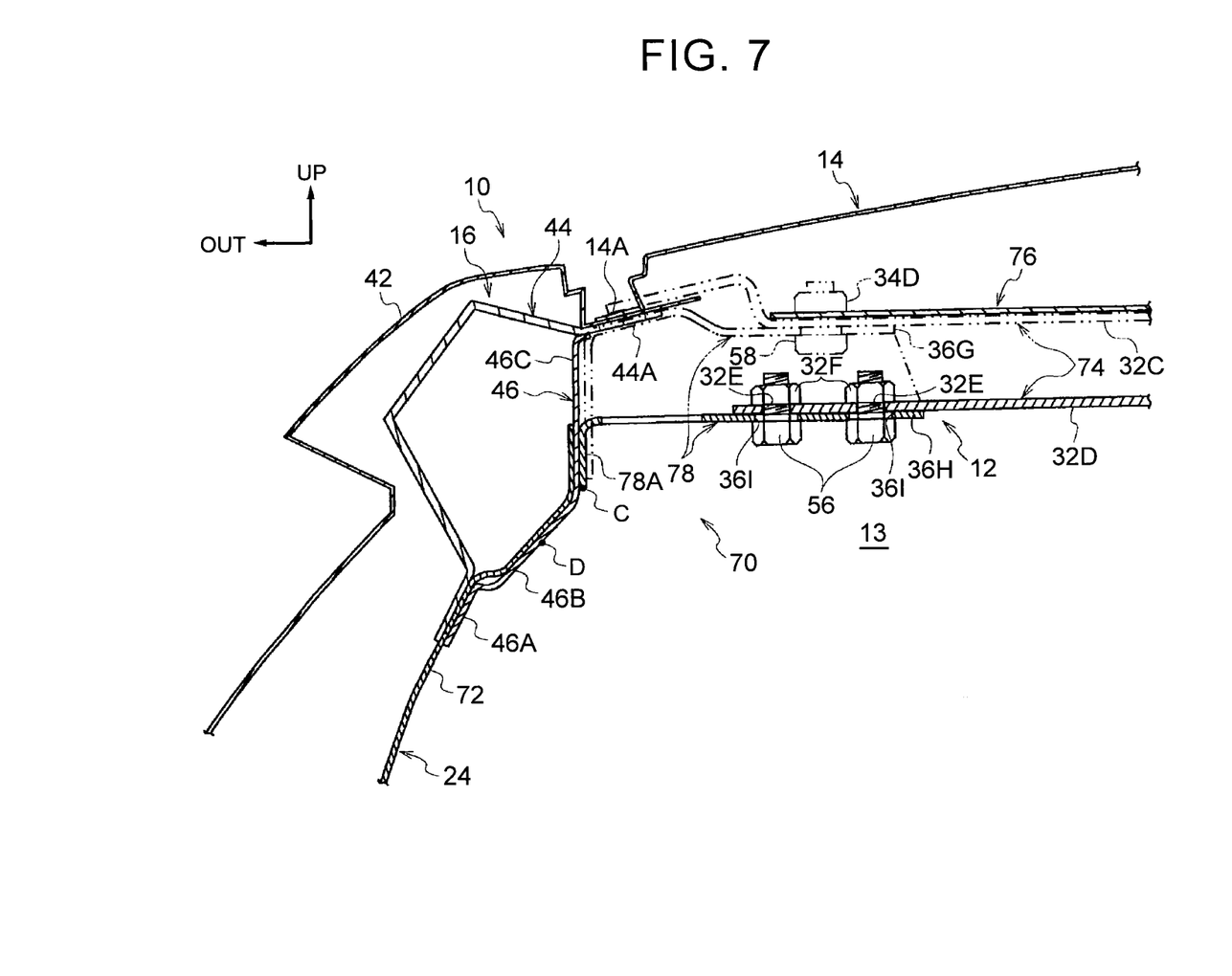
FIG. 7 is an enlarged sectional view of a modified example of the vehicle upper structure according to the example embodiment.

FIG. 7 is a view of a vehicle upper structure 70 according to a modified example. The vehicle upper structure 70 may be provided instead of the vehicle upper structure 30 (see FIG. 1) in the vehicle 10 according to the example embodiment shown in FIG. 1. Structure that is similar to that of the vehicle upper structure 30 will be denoted by like reference characters and descriptions of that structure will be omitted as appropriate. Similar structure is understood to include structure having basically the same function even though the lengths and shapes of some portions differ.

Also, in FIG. 7, portions and members that are offset in the vehicle front-rear direction from portions with cross-sections indicated by hatching are indicated by alternate long and two short dashes lines. The vehicle upper structure 70 is bilaterally symmetrical in the vehicle width direction of the vehicle 10, so only the vehicle upper structure 70 on the left side will be described, as an example, while a description of the vehicle upper structure 70 on the right side will be omitted.

The vehicle upper structure 70 includes a roof side rail 16, a first roof reinforcement 74 and a second roof reinforcement 76 as roof reinforcements, and a gusset 78. The first roof reinforcement 74 will hereinafter be referred to as "first roof R/F 74", and the second roof reinforcement 76 will hereinafter be referred to as "second roof R/F 76".

With the vehicle upper structure 70, the lower end portion of the roof side rail outer panel 44 is connected by welding to an upper portion in the vehicle up and down direction of a center pillar inner panel 72 that forms a portion of the center pillar 24. Also, the upper end portion 44A of the roof side rail outer panel 44 is connected to the side outer panel 42 by welding. The lower end portion 46A of the roof side rail inner panel 46 is connected by welding to the upper portion of the center pillar inner panel 72 in the vehicle up and down direction. Also, the upper end of the vertical wall portion 46C of the roof side rail inner panel 46 is connected by welding to the upper end portion 44A of the roof side rail outer panel 44. In this way, the roof side rail 16 forms a closed cross-section.

The first roof R/F 74, in one example, has the same sectional shape, when viewed in the vehicle width direction, as the first roof R/F 32 (see FIG. 5), and has the first flange portions 32C and the bottom portion 32D. Also, the first roof R/F 74 extends in the vehicle width direction. Furthermore, the through-holes 32E extend through in the vehicle up and down direction are formed in an outer end portion in the vehicle width direction of the first roof R/F 74. In addition, the weld nuts 32F are integrally formed on a peripheral edge portion of the through-holes 32E.

The second roof R/F 76, in one example, is formed by a plate member that is arranged with the vehicle up and down direction as the plate thickness direction and extends in the vehicle width direction. Also, a through-hole, not shown, that passes through in the vehicle up and down direction is formed in an outer end portion in the vehicle width direction of the second roof R/F 76. A weld nut 34D is integrally formed on a peripheral edge portion of this through-hole.

The gusset 78, in one example, has the same sectional shape, when viewed in the vehicle width direction, as the gusset 36 (see FIG. 5), and has the second flange portions 36G and the bottom portion 36H that extend in the vehicle width direction. Also, a vertical wall portion 78A that extends downward in the vehicle up and down direction from an outer end portion of the bottom portion 36H in the vehicle width direction, when viewed in the vehicle front-rear direction, is formed on the gusset 78. Moreover, the through-hole 36I that passes through in the vehicle up and down direction is formed in the bottom portion 36H of the gusset 78.

The vertical wall portion 78A of the gusset 78, in one example, is connected by welding to the vertical wall portion 46C of the roof side rail inner panel 46, in a position that is to the inside of the vertical wall portion 46C of the roof side rail inner panel 46 in the vehicle width direction, and lower than the center portion of the vertical wall portion 46C of the roof side rail inner panel 46 in the vehicle up and down direction. A position on a lower end of the vertical wall portion 78A in the vehicle up and down direction will be referred to as position C (indicated by point C). Also, a position in the center of the inclined portion 46B in the vehicle up and down direction will be referred to as position D (indicated by point D). Position C is not limited to being set on the vertical wall portion 46C, and may also be set in position D on the inclined portion 46B. That is, the vertical wall portion 78A of the gusset 78 may be extended to the inclined portion 46B of the roof side rail inner panel 46.

Here, in the assembly of the vehicle upper structure 70, the vertical wall portion 78A of the gusset 78 is connected to the roof side rail 16 by welding. The roof panel 14, the first roof R/F 74, and the second roof R/F 76 that are connected together are positioned in place on an upper surface of the gusset 78 in the vehicle up and down direction. Also, the bottom portion 36H of the gusset 78 and the bottom portion 32D of the first roof R/F 74 are fastened together by the first bolts 56 from below while being overlapped in the vehicle up and down direction. Moreover, the second flange portions 36G of the gusset 78, the first flange portions 32C of the first roof R/F 74, and the second roof R/F 76 are fastened together by the second bolt 58 from below while being overlapped in the vehicle up and down direction.

With the vehicle upper structure 70, a collision load that is input is transmitted by the entire cross-section in the vehicle front-rear direction of the first roof R/F 74, the second roof R/F 76, and the gusset 78, by the bottom portion 36H being fastened to the bottom portion 32D, and the second flange portions 36G being fastened to the first flange portions 32C. Also, the sectional shapes in the vehicle front-rear direction of the first roof R/F 74, second roof R/F 76, and gusset 78 are inhibited from becoming misshapen. As a result, with the vehicle upper structure 70, a load is efficiently transmitted to the first roof R/F 74, the second roof R/F 76, and the gusset 78, so deformation of the vehicle upper portion 12 when a side collision occurs is able to be inhibited.

Also, with the vehicle upper structure 70, the first roof R/F 74 and the second roof R/F 76 are arranged higher in the vehicle up and down direction than the first roof R/F 32 and the second roof R/F 34 in the vehicle upper structure 30 (see FIG. 3). Also, the bottom portion 36H of the gusset 78 extends inward in the vehicle width direction from the center portion in the vehicle up and down direction of the vertical wall portion 46C of the roof side rail inner panel 46, to conform with the first roof R/F 74 and the second roof R/F 76 being arranged higher in the vehicle up and down direction. In this way, with the vehicle upper structure 70, the space in the vehicle cabin 13 is able to be increased as a result of the first roof R/F 74 and the second roof R/F 76 being arranged higher in the vehicle up and down direction.

Other Modified Examples

In the example embodiment, with the vehicle upper structure 30 and 70, a connecting structure that is the same on both sides in the vehicle width direction is applied, but the vehicle upper structure 30 and 70 are not limited to this. That is, a connecting structure that is different on one side than it is on the other side in the vehicle width direction may also be applied. For example, on one side in the vehicle width direction, the members may be connected by laser welding or spot welding, and on the other side in the vehicle width direction, the members may be connected together by nuts and bolts.

Also, in the vehicle upper structure 30, the number of first bulging portions 32A and second bulging portions 36E in the vehicle front-rear direction is not limited to two, and may also be one or a plurality of three or more. Further, the number of first protruding portions 32B and second protruding portions 36F in the vehicle width direction is not limited to one, and may also be a plurality of two or more. In addition, a structure in which the first protruding portion 32B and the second protruding portion 36F are not provided may also be used.

Also, in the vehicle upper structure 30, the number of first bolts 56 is not limited to two in the vehicle front-rear direction, and may also be a plurality of three or more (the number of first bolts 56 on the front side may differ from the number of bolts 56 on the rear side of the first flange portions 32C and the second flange portions 36G in the vehicle front-rear direction. Further, the number of bolts 56 is not limited to one in the vehicle width direction, and may also be a plurality of two or more.

In addition, in the vehicle upper structure 30, the number of second bolts 58 is not limited to two in the vehicle front-rear direction, and may also be one or a plurality of three or more. Furthermore, the number of bolts 58 is not limited to two in the vehicle width direction, and may also be one or a plurality of three or more.

Moreover, in the vehicle upper structure 30, a structure in which the second roof R/F 34 is not provided may also be used.

A vehicle upper structure according to example embodiments of the invention and modified examples thereof have been described, but these example embodiments and modified examples may also be used in appropriate combinations. That is, the invention may be carried out in any one of a variety of modes within the scope of the invention.

What is claimed is:
1. A vehicle upper structure comprising:
a roof side rail that extends in a vehicle front-rear direction;
a roof reinforcement that includes a first bulging portion that bulges out downward in a vehicle up and down direction, and a first flange portion that protrudes in the vehicle front-rear direction from the first bulging portion, the roof reinforcement extending farther toward an inside of a vehicle cabin in a vehicle width direction than the roof side rail; and
a gusset that is arranged extending between the roof side rail and an end portion of the roof reinforcement in the vehicle width direction, the gusset has, on an inner end portion on an inside in the vehicle width direction, a second bulging portion that bulges out downward in the vehicle up and down direction and a second flange portion that protrudes in the vehicle front-rear direction from the second bulging portion, the gusset being connected at an outer end portion on an outside in the vehicle width direction to the roof side rail, the gusset being such that the second bulging portion and the second flange portion are overlapped with, and fastened to, the first bulging portion and the first flange portion, respectively, from below in the vehicle up and down direction, wherein
a first protruding portion that protrudes upward in the vehicle up and down direction from a bottom portion of the first bulging portion is formed on the roof reinforcement; and
a second protruding portion that protrudes upward in the vehicle up and down direction from a bottom portion of the second bulging portion and overlaps with the first protruding portion from below in the vehicle up and down direction, is formed on the gusset.

2. The vehicle upper structure according to claim 1, wherein
the gusset is fastened in at least two locations to the first flange portion in the vehicle front-rear direction; and
the gusset is fastened in at least two locations to the first bulging portion, with the first protruding portion located between the at least two locations in the vehicle front-rear direction.

3. The vehicle upper structure according to claim 1, wherein
the roof reinforcement includes a first roof reinforcement that has the first bulging portion and the first flange portion and is overlapped with the gusset from above in the vehicle up and down direction, and a second roof reinforcement that is overlapped with the first roof reinforcement from above in the vehicle up and down direction so as to form a closed cross-section with the first roof reinforcement; and
the first flange portion, the second flange portion, and the second roof reinforcement are fastened together.

4. A vehicle upper structure comprising:
a roof side rail that extends in a vehicle front-rear direction;
a roof reinforcement that includes a first bulging portion that bulges out downward in a vehicle up and down direction, and a first flange portion that protrudes in the vehicle front-rear direction from the first bulging portion, the roof reinforcement extending farther toward an inside of a vehicle cabin in a vehicle width direction than the roof side rail; and
a gusset that is arranged extending between the roof side rail and an end portion of the roof reinforcement in the vehicle width direction, the gusset has, on an inner end portion on an inside in the vehicle width direction, a second bulging portion that bulges out downward in the vehicle up and down direction and a second flange portion that protrudes in the vehicle front-rear direction from the second bulging portion, the gusset being connected at an outer end portion on an outside in the vehicle width direction to the roof side rail, the gusset being such that the second bulging portion and the second flange portion are overlapped with, and fastened to, the first bulging portion and the first flange portion, respectively, from below in the vehicle up and down direction, wherein the roof reinforcement includes a first roof reinforcement that has the first bulging portion and the first flange portion and is overlapped with the gusset from above in the vehicle up and down direction, and a second roof reinforcement that is overlapped with the first roof reinforcement from above in the vehicle up and down direction so as to form a closed cross-section with the first roof reinforcement;

the first flange portion, the second flange portion, and the second roof reinforcement are fastened together;

a roof panel is provided above the second roof reinforcement in the vehicle up and down direction, and an extended portion that extends toward the roof side rail and is supported by the roof side rail is formed on an end portion of the second roof reinforcement in the vehicle width direction;

a stepped portion that makes a height of the second roof reinforcement in the vehicle up and down direction lower than a height of the extended portion in the vehicle up and down direction is formed on the extended portion; and a fastening member that fastens the first roof reinforcement, the second roof reinforcement, and the gusset together is fastened from below in the vehicle up and down direction.

5. The vehicle upper structure according to claim 1, wherein a vertical wall portion that extends downward in the vehicle up and down direction from an outer end portion of a bottom portion in the vehicle width direction when viewed from the vehicle front-rear direction is formed on the gusset; and the vertical wall portion of the gusset is connected by welding to a vertical wall portion of a roof side rail inner panel, in a position that is to inside of the vertical wall portion of the roof side rail inner panel in the vehicle width direction, and lower than a center portion of the vertical wall portion of the roof side rail inner panel in the vehicle up and down direction.

* * * * *